US007777590B2

(12) United States Patent
Haslböck et al.

(10) Patent No.: US 7,777,590 B2
(45) Date of Patent: Aug. 17, 2010

(54) HF SOCKET

(75) Inventors: Albert Haslböck, Kiefersfelden (DE); Anton Ilsanker, Riedering (DE); Christian Linke, Ainring (DE)

(73) Assignee: Kathrein-Werke KG, Rosenheim (DE)

( * ) Notice: Subject to any disclaimer, the term of this patent is extended or adjusted under 35 U.S.C. 154(b) by 1037 days.

(21) Appl. No.: 11/498,262

(22) Filed: Aug. 3, 2006

(65) Prior Publication Data

US 2007/0184713 A1 Aug. 9, 2007

(30) Foreign Application Priority Data

Aug. 4, 2005 (DE) ....................... 10 2005 036 810

(51) Int. Cl.
*H01P 1/10* (2006.01)
*H01R 9/05* (2006.01)
*H02H 7/00* (2006.01)

(52) U.S. Cl. ....................... 333/100; 333/109; 725/127; 361/56

(58) Field of Classification Search ................. 333/100, 333/101, 109; 725/127; 439/578; 361/56
See application file for complete search history.

(56) References Cited

U.S. PATENT DOCUMENTS

| | | | | |
|---|---|---|---|---|
| 5,235,619 | A * | 8/1993 | Beyers et al. | 375/260 |
| 7,430,103 | B2 * | 9/2008 | Kato | 361/212 |
| 2002/0135963 | A1 * | 9/2002 | Pagliuca | 361/117 |
| 2006/0225098 | A1 * | 10/2006 | James et al. | 725/63 |
| 2006/0291118 | A1 * | 12/2006 | Chen | 361/91.1 |

FOREIGN PATENT DOCUMENTS

| | | | |
|---|---|---|---|
| DE | 41 35 121 | A1 | 4/1993 |
| DE | 197 49 120 | A1 | 6/1999 |
| DE | 100 05 763 | A1 | 8/2001 |
| DE | 101 55 481 | A1 | 5/2003 |
| EP | 1 195 932 | A2 | 4/2002 |

* cited by examiner

*Primary Examiner*—Robert Pascal
*Assistant Examiner*—Alan Wong
(74) *Attorney, Agent, or Firm*—Nixon & Vanderhye PC

(57) ABSTRACT

An improved HF socket or HF plug socket for connecting to a coaxial wiring system comprises an integrated monitoring means comprising a monitoring circuit arranged in a feed path extending in the HF socket between an interface for connecting a receiver and a junction to the wiring system or to the single-cable system. The monitoring circuit comprises a cut-off or interruption means by which the feed path is interrupted when a direct-voltage signal originating from a connected receiver is applied with a voltage above a threshold voltage for feeding into the wiring system or into the single-cable system over a predetermined or preadjustable period of time (τ).

10 Claims, 2 Drawing Sheets

HF SOCKET

Figure 1:
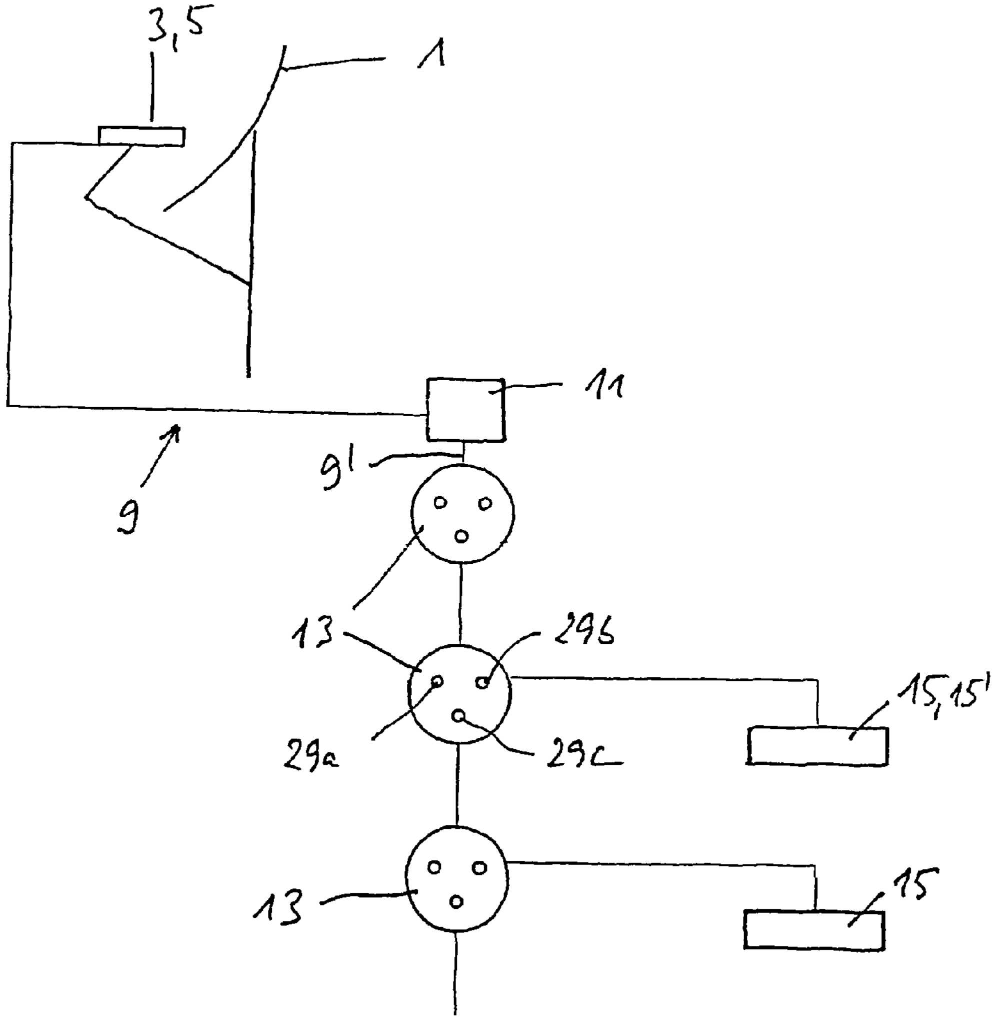

The invention relates to an HF socket, in particular an HF plug socket, according to the preamble of claim 1.

HF sockets or HF plug sockets are used in wiring systems, in particular for receiving television and/or radio programs. Reference is usually made to HF plug sockets, since conventionally coaxial connection cables may be connected to an HF plug socket of this type using plug connectors. Since the type of connection is also possible using rotary connections, etc., reference will be made hereinafter simply to HF sockets which, in particular, also consist of an HF plug socket.

HF sockets of this type are used, in particular, for receiving programs broadcast via satellite.

The programs broadcast by a satellite via vertical and horizontal polarizations may be converted, with respect to an upper and/or a lower frequency band using a suitable converter circuit, into an intermediate frequency, wherein, depending on the number of subscribers or receivers to be connected, one or more matrix circuits may be connected downstream.

In a construction of this type, the aforementioned high-frequency plug socket (HF socket) acts as an interface between the HF distribution system and the receiver or a television or radio device.

However, in addition to the HF characteristic, the HF socket also has to perform a further function. For remote powering of the connected HF components, such as for example multiswitches or converters (LNB converters, etc.), is required. As a result of the level of the remote supply voltage, the polarization of multiswitches or an LNB converter may, for example, be selected. An 18 V supply signal is used, for example, for receiving horizontally polarized waves and a change-over to a 14 V direct-voltage signal is used for receiving vertically polarized waves.

However, in addition to star wiring systems, there are also what are known as single-cable or tree systems. A corresponding single-cable solution using what is known as a single-cable matrix is, for example, known from the Kathrein brochure "Einkabel-Matrix UFO® micro zur Sat-Signal-verteilung in Durchschleifsystemen", which was published in September 2002. In such systems, a plurality of TV or radio devices may be connected, one after another, to a single coaxial cable. In systems of this type, too, 13 V are generally used on the coaxial cable for supplying the connected head stations. For the purposes of signaling and change-over, the bus of a connected receiver (or television device or radio device, etc.) is briefly switched to 18 V and what is known as a DiSEqC command is superimposed. This is a pulse width modulated 22 kHz signal (EN 61319-1A11). If a receiver were then to continue to power the bus at 18 V, this would block further signaling from other receivers. In other words, other receivers are then no longer able to change-over a program.

For this reason, provision has been made for the existing head point to monitor the direct voltage supplied to it. If the higher change-over voltage of, for example, 18 V were applied for longer than a specific period of time (i.e. a specific $\tau$), the head station would activate a higher load, as a result of which the relevant HF socket, via which a connected receiver supplies the higher direct-voltage signal of, for example, 18 V, is deactivated. This ensures that at least the other connected receivers may continue to carry out a desired change-over for receiving an individually desired program.

DE 41 35 121 A1 discloses an HF socket for connecting to coaxial wiring systems constructed in the manner of a single-cable system. The HF socket has a circuit arrangement for feeding direct current into the antenna main line, which comprises directional diodes, as a result of which a change-over of the polarization plane of a converter of a satellite reception system is, for example, facilitated.

DE 101 55 481 A1 discloses an HF socket comprising a cut-off or interruption means. This HF socket is connected to a central control means via which signals for controlling the release of television signals may be transmitted. This allows portions of the frequency spectrum to be filtered out of the received signals and not provided to a user, depending on his use authorization.

A further HF socket is also known from DE 100 05 763 A1. This antenna socket additionally has an address module via which it is clearly identifiable in a distribution network. Subsequent sockets may be switched on or off using a switching means.

Finally, DE 197 49 120 A1 discloses a satellite reception system which has a data bus for controlling a plurality of subscribers or receivers, the receivers being provided with a means for generating an anticollision signal. This ensures that at a given moment only one receiver may communicate with a controller via the data bus provided.

Starting from the generic prior art, the object of the present invention is to provide an improved solution in order to deactivate a relevant receiver which feeds into the single-cable system or into a tree-structure cable system differing therefrom a specific direct-voltage signal, for example a high direct-voltage signal required only during the change-over phase, for an excessively long period of time.

According to the invention, the object is achieved in accordance with the features specified in claim 1. Advantageous configurations of the invention are recited in the sub-claims.

The present invention provides a solution which is significantly improved over the conventional solutions, while the overall construction is comparatively simple and reliable.

That is to say, according to the invention, a function comparable to the prior art, which seeks to deactivate a defectively adjusted receiver supplying an excessively high direct-voltage signal for an excessively long period of time, is now ensured in that a detection means, which itself checks the direct voltage supplied, is provided in a relevant HF socket or HF plug socket. This detection and monitoring means then deactivates the connected receiver if the direct voltage supplied remains at the excessively high direct-voltage level for a correspondingly predeterminable period of time. The period of time $\tau$ for deactivating a defective receiver is adjusted in such a way that a specific number of DiSEqC commands pass the bus unimpeded. The HF socket according to the invention, with the correspondingly provided deactivation means, becomes effective only from a preadjustable current. Even normal multiswitches having a relatively low load may therefore easily be operated at the reception sockets.

Figure 2:
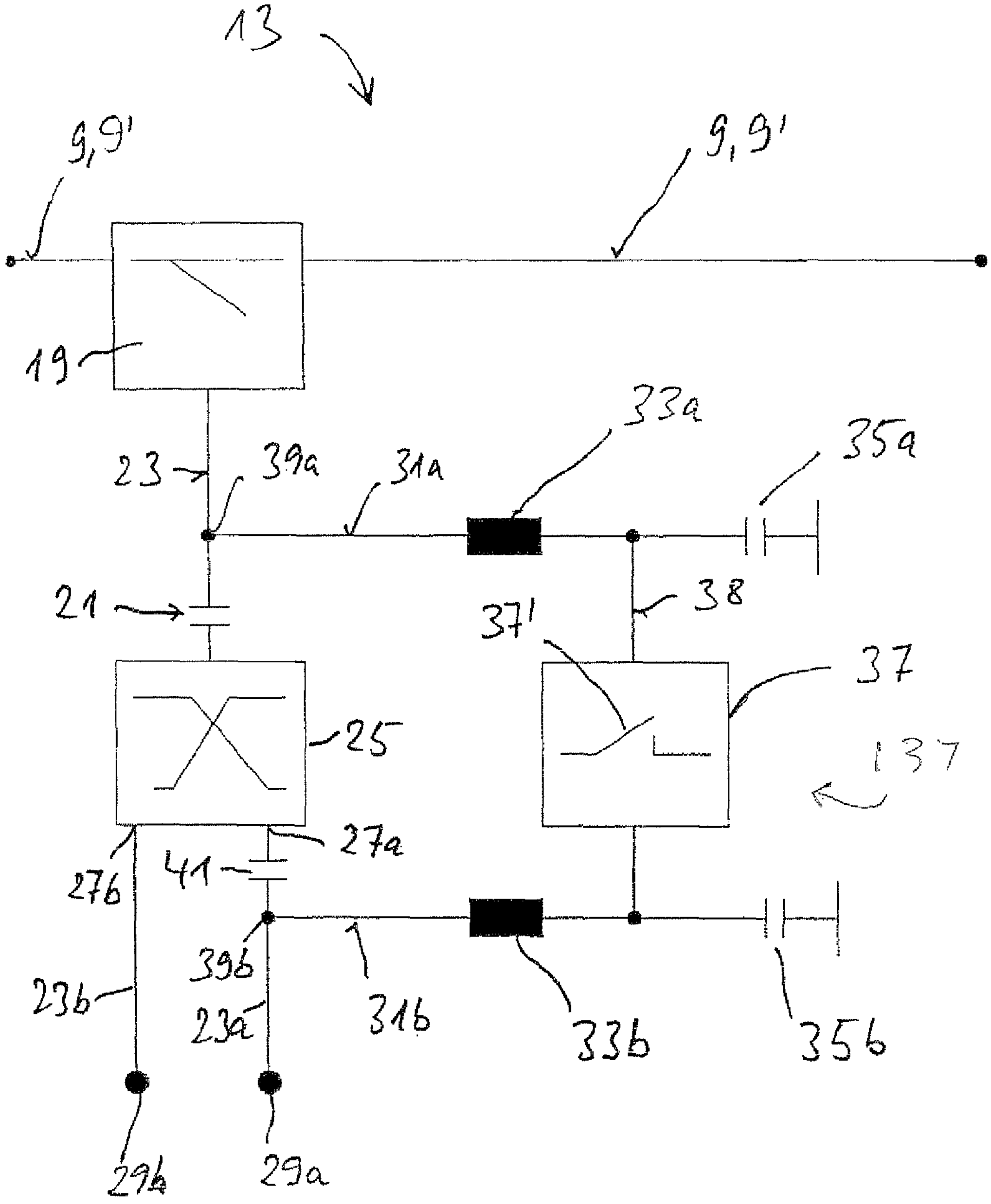

The invention will be described hereinafter in greater detail with reference to the drawings, in which specifically:

FIG. 1 shows a schematic construction of a satellite reception system with a single-cable system or a tree-structure cable system; and FIG. 2 shows a schematic view of an HF socket according to the invention for receiving TV and/or radio programs.

FIG. 1 is a schematic side view of a satellite antenna 1, generally a parabolic satellite antenna 1, comprising a reception or feed system 3 conventionally having at least one converter, for example what is known as an LNB converter 5. The converter may be constructed in such a way that the programs broadcast with horizontal or vertical polarization may be received via said converter.

By corresponding change-over, the programs broadcast in a higher or in a lower frequency band may, for example, be received. The converter may be a single-feed converter or also, for example, a multi-feed converter in which the programs broadcast by two satellites may, for example, be received.

The illustrated embodiment shows a wiring system 9, comprising what is known as a single-cable solution, proceeding from the single-cable matrix 11. Instead, a tree structure may also be provided in which a single-cable solution merges with various branches via branching points.

The wiring system is conventionally constructed using coaxial cables.

In the illustrated embodiment, three HF sockets 13 according to the invention, to which a respective receiver 15 may, for example, be connected, are connected in series using, for example, a single-cable matrix 11 and a subsequent single-cable connection 9'. Provided, as is indicated in FIG. 1, that the matrix 11 is arranged remote from the reception or feed system 3 or the LNB guard 5, a transmission cable (conventionally a coaxial cable) may of course be provided on this section between the converter 5 and the matrix 11 for each frequency band range to be received and/or for each of the polarizations (vertical and horizontal) to be received, what is known as a single-cable system (optionally having a branched tree structure) then leading from the matrix 11 to the connected subscribers 15.

A desired program may be adjusted via a receiver 15 in a subscriber or receiver-dependent manner, independently of an adjacent receiver via which a completely different individually desired program may be adjusted.

A change-over for receiving programs, some of which are broadcast via vertical polarization and others of which are broadcast via horizontal polarization, is, for example, provided at the receiver or subscriber end by change-over from a direct voltage of 13 V to one of 18 V.

On this change-over to, for example, 18 V, there is simultaneously supplied a specific DiSEqC command which is passed through to the connected single-cable matrix, where it converts a desired program to a specific frequency which may be received by the relevant receiver 15.

In order to ensure that the higher direct-voltage signal is not applied for longer than a specific period of time and is supplied in the single-cable connection 9' (as a result of which the other receivers may be blocked and carry out no further change-over), the HF sockets according to the invention, which are outlined in FIG. 1 and illustrated in detail in FIG. 2, are provided.

As may be seen from the detailed construction according to FIG. 2, in the wiring system using, for example, a single-cable connection 9' or using a tree-structure (i.e. non-star-shaped) wiring system, there is initially connected in a relevant HF socket 13 according to the invention a directional coupler 19 via which a signal to be received (which may correspond, for example, to a television or radio program to be received) is decoupled.

On the decoupling section of the directional coupler 19 there is provided a reception line 23 which ultimately leads to the connection points (interfaces) of the HF socket.

In the illustrated embodiment of the reception line 23, for example, there is connected downstream of the capacitor 21 a dividing network 25, via which splitting may be carried out for receiving the terrestrial signals or the satellite signals; in other words, the terrestrially supplied programs may be received at one output 27*b* of the dividing network 25 and the signals received via the satellite antenna may be received via the output 27*a*. In the decoupling section, the single reception line 23 issuing from the directional coupler is accordingly split into two reception lines 23*a* and 23*b*, which lead to an interface 29*a* or 29*b* in the HF socket, to which a corresponding receiver 15 may be connected. In addition to the two interfaces 29*a* and 29*b* thus formed, preferably in the form of plug connectors, there may also be provided—as may be seen from FIG. 1—a further interface 29*c*, via which the received radio programs may, for example, be received.

As may also be seen from FIG. 2, a branch line 31*a* issues from a branching point 39*a* in the reception line (in the section between the directional coupler 19 and the capacitor 21). A second branch line 31*b* issues from a branching point 39*b* located between the capacitor 41, connected downstream of the dividing network 25, and the interface 29*a* for connecting the receiver. A respective decoupling means 33*a*, 33*b*, which will also be referred to hereinafter as the DC decoupling means or direct-voltage decoupling means 33*a*, 33*b* for short, is connected in these branch lines 31*a* and 31*b*. Only direct-voltage components, and not HF signals, may therefore be forwarded via these DC decoupling means or direct-voltage decoupling means.

The DC decoupling is caused, per se, by the direct-voltage decoupling means 33*a* and 33*b* (preferably in the form of inductors) and the capacitors 35*a* and 35*b* in the two branch lines 31*a* and 31*b*. There is thus formed, in each case, a low-pass filter, which lets through the direct-voltage component.

Between the two branch lines 31*a* and 31*b*, on the connection side, opposing the reception line 23 or 23*a*, of the direct-voltage decoupling means 33*a* and 33*b*, there is provided, in each case, a connection line 38 in which a monitoring circuit 137 is interposed. This construction forms a monitoring means 37 having a bypass or parallel line extending between the two branch-off points 39*a* and 39*b* and comprising at its core a monitoring circuit 137. Reference is, therefore, sometimes also made to a direct-voltage monitoring means 37, since the voltage, i.e. the direct voltage (of the direct current), is monitored using this monitoring means 37.

As may also be seen from FIG. 2, the branch line 31*b* is connected to the reception line 23*a* in such a way that still a further capacitor 41 for DC blocking is also connected between the connection point 39*b* thus formed and the output 27*a* of the dividing network 25.

The functioning of the HF socket thus formed will be considered hereinafter.

If, for example, change-over to a different program is to be carried out via the receiver 15' shown in FIG. 1, the supplied direct-voltage signal is firstly increased via this receiver 15', for example, from 13 V to now 18 V. At the same time, there is superimposed on the 18 V signal a DiSEqC command with which the corresponding change-over to the desired program is carried out, so the received signals are converted to a specific frequency which may be received via the relevant receiver.

The lower direct-voltage signal of 13 V and the direct-voltage signal with, for example, 18 V are supplied, for example, via the terminal 29*a* and the bypass or parallel section 38, bypassing the dividing network 25, i.e. via the DC decoupling means 33*b*, the DC monitoring means 37, the further DC decoupling means 33*a* in the branch line 31*a*, the directional coupler 19 and the wiring system 9 which leads to the single-cable matrix 11. This route defines a feed path via which, for example, the matrix circuit 11 or the converter of at least one of the connected subscribers is supplied with a direct voltage, facilitating operation, of, for example, 13 V or 14 V or the like (i.e. a relatively low direct-voltage level). The DC monitoring means 37 then monitors the time for which the direct-voltage signal with higher direct voltage, for example a 17 V or 18 V signal, is applied. If the corresponding receiver 15 is operating correctly, this receiver automatically switches back, once the DiSEqC signal has been dispatched within a period of time less than τ, to the direct-voltage signal with lower direct voltage (i.e., for example, 13 V), which is fed into the wiring system in order to operate the matrix, the converter, etc.

However, if the relevant receiver is operating defectively or is wrongly adjusted and if the DC monitoring means 37 establishes that the direct-voltage signal with higher direct voltage is still being applied even after a preselectable or preadjustable or predetermined period of time τ has been exceeded, the direct-voltage monitoring means 37 interrupts the bridge line 38 between the two direct-voltage decoupling lines 31*a*, 31*b* using an integrated circuit breaker 37'.

The defectively operating receiver of the wiring system 9 is therefore completely deactivated, so the other connected receivers may continue to change-over to a desired program without difficulty.

Preferably, the overall arrangement is such that not only the period of time τ and the threshold voltage, on exceeding of which deactivation is carried out, may be adjusted. Optionally, it is also possible to operate the HF socket in such a way that deactivation on exceeding a threshold voltage takes place after exceeding the period of time τ only if a preadjustable threshold for the direct current is additionally reached or exceeded.

In a construction of this type, even normal multiswitches having a low load may easily be operated in an HF socket according to the invention.

As described above, in a conventional multiswitch (matrix circuit) with a star-shaped wiring system, the direct voltage of a connected receiver is used both for supplying the multiswitch (of the matrix circuit) and for the selection of horizontally or vertically polarized input signals. In other words, the change-over from a relatively low voltage of, for example, 13 V to 18 V is used simultaneously as a change-over signal for the reception of other transmitters. Conversely—also as described above—in a single-cable system, the single-cable multiswitch voltage level fed by the connected receiver is used no longer as a criterion for change-over, but rather merely as a priority feature for the DiSEqC command to be transmitted, via which the transmitter selection takes place. A further feature of this single-cable multiswitch is the comparatively increased power consumption, i.e. the higher load which the receiver has to supply.

This leads to the abovementioned advantageous configuration of the described monitoring means. For, in this case, there could be provided an additional criterion according to which the monitoring means in the HF socket acts only from a conventional high current for single-cable multiswitches.

In this case, the monitoring means would generally be inactive—even if a high change-over signal of, for example, 18 V is applied for a period of time greater than τ—if the described HF socket according to the invention is used only in conjunction with normal multiswitches (matrix circuit) which are operated at a relatively low load and in which a relatively high voltage change-over signal of, for example, 18 V is continuously applied and used as a criterion for change-over.

The invention claimed is:

1. An HF socket for connecting to at least one single cable or tree-structured coaxial wiring system, comprising:

an integrated monitoring circuit arranged in a feed path extending in the HF socket between an interface for connecting a receiver and a junction to the at least one wiring system, the monitoring circuit comprising a cut-off or interrupter by which the feed path is interrupted when a direct-voltage signal originating from a connected receiver is applied with a voltage above a threshold voltage for feeding into the at least one wiring system over a predetermined or preadjustable period of time (τ).

2. The HF socket as claimed in claim 1, wherein the HF socket further comprises a directional coupler via which a received signal may be decoupled from the at least one wiring system into a reception line, the reception line leading to the interface for connecting to the connected receiver, and wherein at least one capacitor is connected in the reception line.

3. The HF socket as claimed in claim 2, wherein parallel to the at least one capacitor there is provided a bypass section which forms a portion of the feed path and in which the monitoring circuit is connected.

4. The HF socket as claimed in claim 3, wherein the bypass section comprises first and second branch lines, the first branch lines branching off, between the at least one capacitor and the directional, at one branch-off point and the second branch line branching off, between the at least one capacitor and the interface for connecting the connected, at another branch-off point, and wherein the monitoring circuit is provided in a connection line electrically connecting the two branch lines.

5. The HF socket as claimed in claim 4, wherein a direct-voltage decoupling means is provided between the one and another branch-off points and inputs or outputs of the monitoring circuit.

6. The HF socket as claimed in claim 4, wherein at least one of the first and second branch lines is grounded, at its end opposing the one and another branch-off points, via a grounding capacitor.

7. The HF socket as claimed in claim 4, wherein the at least one capacitor is located between the one branch-off point and an input of a dividing network, and further comprising a second capacitor provided at one or more outputs of the dividing network for receiving programs broadcast via satellite on the at least one wiring system and the another branch-off point for the second branch line.

8. The HF socket as claimed in claim 1 further comprising at least two outputs applying signals received via satellites or terrestrially, on the at least one wiring system and a dividing network connected to the at least two outputs in a reception line.

9. The HF socket as claimed in claim 1, wherein the monitoring circuit monitors a time duration of the higher of two direct-voltage levels of the direct-voltage signal.

10. The HF socket as claimed in claim 1, wherein the monitoring circuit is constructed in such a way that the feed path is interrupted only if direct current in the feed path is above an optionally preadjustable value.

* * * * *